(12) United States Patent
Garcia-Luna-Aceves et al.

(10) Patent No.: US 6,928,061 B1
(45) Date of Patent: Aug. 9, 2005

(54) TRANSMISSION-SCHEDULING COORDINATION AMONG COLLOCATED INTERNET RADIOS

(75) Inventors: Jose J. Garcia-Luna-Aceves, San Mateo, CA (US); Chane L. Fullmer, Santa Cruz, CA (US)

(73) Assignee: Nokia, Inc., Irving, TX (US)

( * ) Notice: Subject to any disclaimer, the term of this patent is extended or adjusted under 35 U.S.C. 154(b) by 0 days.

(21) Appl. No.: 09/703,075

(22) Filed: Oct. 31, 2000

Related U.S. Application Data

(60) Provisional application No. 60/230,395, filed on Sep. 6, 2000.

(51) Int. Cl.[7] .................................................. H04J 3/17
(52) U.S. Cl. .................... 370/329; 370/350; 370/395.4; 370/458
(58) Field of Search ................................ 370/329, 336, 370/337, 347, 350, 395.4, 458, 236, 445, 238, 256, 345, 352, 355

(56) References Cited

U.S. PATENT DOCUMENTS

| | | |
|---|---|---|
| 4,270,211 A | 5/1981 | Schlichte |
| 4,466,060 A | 8/1984 | Riddle |
| 4,661,902 A | 4/1987 | Hochsprung et al. |

(Continued)

FOREIGN PATENT DOCUMENTS

| | | |
|---|---|---|
| EP | 0539737 A1 | 5/1993 |
| EP | 0565180 A2 | 10/1993 |
| EP | 0615364 A1 | 9/1994 |
| EP | 0841763 A1 | 5/1998 |
| GB | 2271251 A | 4/1994 |
| GB | 2313254 A | 11/1997 |
| WO | WO 96/19887 A1 | 6/1996 |
| WO | WO 97/09805 A | 3/1997 |
| WO | WO 98/09469 A1 | 3/1998 |
| WO | WO 98/18280 A2 | 4/1998 |
| WO | WO 98/35514 A2 | 8/1998 |
| WO | WO 99/46899 A2 | 9/1999 |
| WO | WO 0048367 A3 | 8/2000 |
| WO | WO 01/28170 A2 | 4/2001 |
| WO | WO 0137497 A1 | 5/2001 |

OTHER PUBLICATIONS

Tobagi et al., "Packet Switching in Radio Channels: Part III–Polling and (Dynamic) Split–Channel Reservation Multiple Access", IEEE Transactions on Communications, vol. Com–24. No. 8, Aug. 1976, pp. 832–845.

Fullmer et al., "Solutions to Hidden Terminal Problems in Wireless Networks", Computer Engineering Department, School of Engineering, University of California, Santa Cruz, CA 95064, chane,jj@cse.uscs.edu, Sep. 14–18, 1997, pp. 11 total.

Fullmer et al., "Floor Acquisition Multiple Acess (FAMA) for Packet–Radio Networks", Computer Engineering Department, School of Engineering, University of California, Santa Cruz, CA 95064, chane,jj@cse.ucsc.edu, Aug. 28–Sep. 1, 1995, pp. 12 total.

(Continued)

*Primary Examiner*—Alpus H. Hsu
*Assistant Examiner*—Justin M. Philpott
(74) *Attorney, Agent, or Firm*—Squire, Sanders & Dempsey L.L.P.

(57) ABSTRACT

A method for collocated nodes communicating over a first interface to agree on a conflict-free transmission schedule among themselves, which they can then use to collaborate with neighbors accessed through a second interface, for example through wireless links in order to obtain collision-free transfers of unicast, multicast and broadcast packets over wireless channels, and channel access delay guarantees. The collocated nodes behave as a single virtual node for the purpose of establishing a consistent transmission schedule throughout the nodes of a multihop wireless network.

21 Claims, 8 Drawing Sheets

U.S. PATENT DOCUMENTS

| | | | |
|---|---|---|---|
| 4,677,617 A | | 6/1987 | O'Connor et al. |
| 4,771,448 A | | 9/1988 | Koohgoli et al. |
| 4,789,983 A | * | 12/1988 | Acampora et al. .......... 370/346 |
| 5,088,032 A | | 2/1992 | Bosack |
| 5,130,987 A | | 7/1992 | Flammer |
| 5,142,533 A | | 8/1992 | Crisler et al. |
| 5,231,634 A | | 7/1993 | Giles et al. |
| 5,319,641 A | | 6/1994 | Fridrich et al. |
| 5,394,436 A | * | 2/1995 | Meier et al. ................ 370/338 |
| 5,408,506 A | | 4/1995 | Mincher et al. |
| 5,416,473 A | | 5/1995 | Dulaney, III et al. |
| 5,502,724 A | | 3/1996 | Chen et al. |
| 5,519,717 A | | 5/1996 | Lorenzo et al. |
| 5,548,578 A | | 8/1996 | Matsune et al. |
| 5,600,635 A | | 2/1997 | Hamaki et al. |
| 5,638,371 A | | 6/1997 | Raychaudhuri et al. |
| 5,652,751 A | | 7/1997 | Sharony |
| 5,673,031 A | * | 9/1997 | Meier .......................... 370/346 |
| 5,682,382 A | * | 10/1997 | Shepard ..................... 370/342 |
| 5,687,015 A | | 11/1997 | Abe |
| 5,706,291 A | | 1/1998 | Kainulainen et al. |
| 5,721,725 A | | 2/1998 | Want et al. |
| 5,737,318 A | | 4/1998 | Melnik |
| 5,748,619 A | * | 5/1998 | Meier .......................... 370/256 |
| 5,752,193 A | | 5/1998 | Scholefield et al. |
| 5,771,462 A | | 6/1998 | Olsen |
| 5,918,016 A | | 6/1999 | Brewer et al. |
| 5,968,133 A | | 10/1999 | Latham et al. |
| 5,970,062 A | * | 10/1999 | Bauchot ................ 370/395.21 |
| 6,026,303 A | | 2/2000 | Minamisawa |
| 6,108,314 A | | 8/2000 | Jones et al. |
| 6,178,323 B1 | | 1/2001 | Nagata |
| 6,229,810 B1 | | 5/2001 | Gerszberg et al. |
| 6,363,062 B1 | * | 3/2002 | Aaronson et al. ........... 370/348 |
| 6,400,702 B1 | * | 6/2002 | Meier .......................... 370/256 |

OTHER PUBLICATIONS

Kwang–Cheng Chen, "Medium Access Control of Wireless LANs for Mobile Computing", IEEE Network, Sep./Oct. 1994, pp. 50–63.

Garcia–Luna–Aceves et al., "Reversing the Collision–Avoidance Handshake in Wireless Networks", Computer Engineering Department, Baskin School of Engineering, University of California, Santa Cruz, CA 95064 {jj, jamal}@cse.ucsc.edu, Aug. 15–20, 1999, pp. 12 total.

Alan Colvin, "CSMA with collision avoidance", Computer Communications, Techniques, vol. 6, No. 5, Oct. 1983, 1983 Butterworth & Co. (Publishers) Ltd., pp. 225–235.

Lo et al., "Carrier Sense Multiple Access with Collision Detection for Radio Channels", Department of Electrical Engineering, Queen's University, Kingston, Ontario, Oct. 2, 1984, International Communications and Energy Conference, IEEE. pp. 244–247.

Raphael Rom, "Collision Detection in Radio Channels", Chapter 12, Telecommunications Sciences Center, SRI International, Menlo Park, CA, Local Area & Multiple Access Networks, Editor: Raymond L. Pickholtz, The George Washington University, Computer Science Press, 1986, pp. 235–249.

Kleinrock et al., "Packet Switching in Radio Channels: Part I–Carrier Sense Multiple–Access Modes and Their Throughput–Delay Characteristics", IEEE Transactions on Communications, Dec. 1975, vol. COM–23, No. 12, pp. 1400–1416.

Leiner et al., "Issues in Packet Radio Network Design", Proceedings of the IEEE, vol. 75, No. 1, Jan. 1987, pp. 6–20.

Garcia–Luna–Aceves et al., Wireless Internet Gateways (WINGS), 197 IEEE, MILCOM 97 Proceedings, vol. 3 of 3, Nov. 3–5, 1997, pp. 1271–1276.

Ramamoorthy et al., "An Adaptive Hierarchical Routing Algorithm", Proceedings 7 Compsac 83, The IEEE Computer Society's Seventh International Computer Software and Applications Conference, The Palmer House, Chicago, IL, Nov. 7–11, 1983, pp. 93–104.

R.M. Metcalfe and D.R. Boggs, "Ethernet: Distributed packet switching for local computer networks," Communications of the ACM, vol. 19, No. 7, pp. 395–403 (1976).

P802.11 Draft Standard for Information Technology—Telecommunications and information exchange between systems—Local and metropolitan area networks—Specific requirements—"Part 11: Wireless LAN Medium Access Control (MAC) and Physical Layer (PHY) Specifications," IEEE P802.11/D10 (Jan. 14, 1999).

V. Bharghavan, A. Demers, S. Shenker, and L. Zhang, "MACAW: A Media Access Protocol for Wireless LAN's," Proceedings of ACM Sigcomm '94, London, UK, pp. 212–225 (Aug. 31–Sep. 2, 1994).

B. Vaduvur,"Access, Addressing and Security in Wireless Packet Networks," PhD thesis, University of California, Berkeley, Computer Science Department (1995).

J. Jubin and J. Tornow, "The DARPA Packet Radio Network Protocols," Proceedings of the IEEE, vol. 75, No. 1, pp. 21–32 (Jan. 1987).

S. Murthy and J.J. Garcia–Luna–Aceves, "Loop–Free Internet Routing Using Hierarchical Routing Trees," Proc. IEEE INFOCOMM '97, Kobe, Japan (Apr. 7–11, 1997).

Anthony Ephremides and Bruce Hajek, "Information Theory and Communication Networks: an Unconsummated Union," IEEE Transactions on Information Theory, vol. 44, No. 6, pp. 1 & 3 (Oct. 1998).

N. Abramson, "The ALOHA System—Another Alternative for Computer Communications," in Proc., Fall Joint Computer Conference, pp. 281–285 (1970).

R.L. Brewster and A.M. Glass, "Throughput Analysis of Non–Persistent and Slotted Non–Persistent CSMA/CA Protocols," in 4th International Conference on Land Mobile Radio, Institution of Electronic and Radio Engineers, pp. 231–236 (1987).

H.S. Chhaya and S. Gupta, "Performance Modeling of Asynchronous Data Transfer Methods of IEE 802.11 MAC Protocol," Wireless Networks, vol. 3, No. 3, pp. 217–234 (1997).

C.L. Fullmer and J.J. Garcia–Luna–Aceves, "FAMA–PJ: A Channel Access Protocol for Wireless LANs," Proc. First International Conference on Mobile Computing and Networking 1995, Berkeley, California (Nov. 14–15, 1995).

R. Garces and J.J. Garcia–Luna–Aceves, "Floor Acquisition Multiple Access with Collision Resolution," Proc. Second International Conference on Mobile Computing and Networking 1996, Rye, New York (Nov. 10–12, 1996).

L. Kleinrock and M.O. Scholl, "Packet Switching in Radio Channels: New Conflict–Free Multiple Access Schemes," IEEE Trans. Commun., vol. COM–28, pp. 1015–1029 Jul. 1980.

J. Meditch and C. Lea, "Stability and Optimization of CSMA and CSMA/CD Channels," in Advances in Local Area Networks, IEEE Press, pp. 340–362 (1987).

Takagi and L. Kleinrock, "Output processes in contention packet broadcasting systems," IEEE Trans. Commun., vol. COM–33, No. 11, pp. 1191–1199 (1985).

F. Tobagi, "Random Access Techniques for data transmission over packet switched radio networks," PhD Thesis, University of California, Los Angeles, Computer Science Department, School of Engineering and Applied Science, Report UCLA–ENG 7499 (1974).

F.A. Tobagi and L. Kleinrock, "The Effect of Acknowledgement Traffic on the Capacity of Packet–Switched Radio Channels," IEEE Trans. Commun. vol. COM–26, No. 6, pp. 815–826 (1978).

K.S. Trivedi, "Probability and Statistics with Reliability, Queing, and Computer Science Applications," Prentice–Hall (1988).

J. Weinmiller, M. Schlager, A. Festag, and A. Wolisz, "Performance Study of Access Control in Wireless LANs—IEEE 802.11 DFWMAC and ETSI RES 10 Hiperian," Mobile Networks and Applications, vol. 2, No. 1, pp. 55–68 (Jun. 1997).

R.E. Kahn, et al., "Advances in Packet Radio Technology," Invited Paper, Proceedings of the IEEE, vol. 66, No. 11, pp. 1468–1496 (Nov. 1978).

David A. Beyer, "Survivable Adaptive Networks (SURAN) Program: vol. II, Executive Summary," Final Report, Mar. 1992.

G. Jones, Packet Radio: What? Why? How? Articles and Information on General Packet Radio Topics, published by Tucson Amateur Packet Radio Corporation, Tucson, AZ, pp. i–vii, 1–87, and 98–132 (1995).

D. Beyer, M. D. Vestrich, and J. J. Garcia–Luna–Aceves, "The Rooftop Community Network: Free, High–Speed Network Access for Communities", The First 100 Feet: New Options for Internet and Broadband Access (Hurley and Keller, Eds.), Harvard Information Infrastructure Project, The MIT Press, pp. 75–91 (1999).

Revisions to IEEE Std 802.11–1997 IEEE Standard for Wireless LAN Medium Access Control (MAC) and Physical Layer (PHY), IEEE Draft 802.11rev/D6.2 (Jul. 1998).

David A. Beyer, "Survivable Adaptive Networks (SURAN) Program: vol. III, Technical," Final Report, Mar. 1992.

D.A. Beyer, et al., "Packet Radio Network Research, Development and Application," Symposium on Packet Radio, Symposium Proceedings SP–5, vol. 1, pp. 1–73 (Apr. 1989).

Sparrow Quarterly Progress Reports, Q198–Q498, http://www.soc.ucsc.edu/research/ccrg/reports/SPARROW/q1–98.html (also q2–98.html, q3–98.html. and q4–98.html) (Sep. 18, 1997 through Sep. 1, 1998).

J.J. Garcia–Luna–Aceves, "Performance of Floor Acquisition Multiple Access in Ad–Hoc Networks", (1990) pp. 6 pgs. total.

Beyer et al., "Packet Radio Network Research, Development and Application", Information and Telecommunications Sciences and Technology Division, SRI International, (1989), pp. 1–35.

Phil Karn, KA9Q, "MACA–A new Channel Access Method for Packet Radio", (1990), pp. 5 total.

Timothy J. Shepard, "A Channel Access Scheme for Large Dense Packet Radio Networks," Proceedings of ACM SIGCOMM '96, Stanford University, pp. 1–12 (Aug. 1996).

I. Chlamtac, Andras Farago, and Hongbiao Zhang, "Time–Spread Multiple–Access (TSMA) Protocols for Multihop Mobile Radio Networks," IEEE/ACM Transactions on Networking, vol. 5, No. 6, pp. 804–812 (Dec. 1997).

Ji–Her Ju and Victor O.K. Li, "An Optimal Topology–Transparent Scheduling Method in Multihop Packet Radio Networks," IEEE/ACM Transactions on Networking, vol. 6, No. 3, pp. 298–306 (Jun. 1998).

Chenxi Zhu and M.S. Corson, "A Five–Phase Reservation Protocol (FPRP) for Mobile Ad Hoc Networks," Proceedings of IEEE INFOCON '98 (Jul. 1998).

Z. Tang and J.J. Garcia–Luna–Acheves, "Hop Reservation Multiple Aceess (HRMA) for Multichannel Packet Radio Networks," Proceedings of IEEE IC3N '98 (Oct. 12–15; 1998).

I. Chlamtac and A. Lerner, "Fair Algorithms for Maximal Link Activation in Multihop Radio Networks," IEEE Transactions on Communications, vol. COM–35, No. 7 (Jul. 1987).

A. Ephremides and T. Truong, "Scheduling Broadcasts in Multihop Radio Networks," IEEE Transactions on Communications, vol. COM–38, No. 4 (Apr. 1990).

C. David Young, "USAP: a unifying dynamic distributed multichannel TDMA slot assignment protocol," MILCOM '96 Conference Proceedings, vol. 1, pp. 235–239 (Oct. 1996).

I. Chlamtac, W.R. Franta, and K.D. Levin, "BRAM: The Broadcast Recognizing Access Method," IEEE Trans. Commun., vol. COM–27, No. 8 pp. 1183–1189 (Aug. 1979).

PCT International Search Report–PCT/US 01/27336–Sep. 24, 2002.

Bharghavan Vaduvur, "Access, Addressing and Security in Wireless Packet Networks", A dissertation submitted in partial satisfaction of the requirements for the degree of Doctor in Philosophy in Computer Science in the Graduate Division of the University of California at Berkeley, 1995 pp. 140 total.

Sidhu et al., "Inside AppleTalk", Second Edition, Network Systems Development, Apple Computer, Inc. Addison–Wesley Publishing Company, Inc., first printing 1990, 300 pgs. double–sided.

Rom, et al., "Multiple Access Protocols Performance and Analysis", Telecommunication Networks and Computer Systems, Oct. 1989, pp. 92 double–sided.

PCT International Application No.: PCT/US99/21238 WO 00/48367 A3, (Aug. 17, 2000).

Haartsen et al., "Bluetooth: Vision, Goals, and Architecture", Mobile Computing and Communications Review, vol. 2, No. 4, pp. 38–45 XP–000784002.

Chlamtac, et al., "Making Transmission Schedules Immune to Topology Changes in Multi–Hop Packet Radio Networks", IEEE/ACM Transactions on Networking, vol. 2, No. 1, Feb. 1994, pp. 23–29.

Satapathy et al., "Etiquette Modification for Unlicensed Spectrum: Approach and Impact", Published in Proceedings of the IEEE Vehicular Technology Conference, vol. 1, May 1998, pp. 272–276 (5 pages total).

J.J. Garcia–Luna–Aceves, "Performance of Floor Acquisition Multiple Access in Ad–Hoc Networks", pp. 6 pgs. total. (1990).

S. Ramanathan et al., "Scheduling Algorithms for Multi–hop Radio Networks", 1992 ACM 0–89791–526–7/92/008/0211, pp. 211–222.

David A. Beyer, "Accomplishments of the DARPA SURAN Program", Information and Telecommunications Sciences and Technology Division, SRI International, 1990 IEEE, pp. 0855–0862.

Beyer et al., "Packet Radio Network Research, Development and Application", Information and Telecommunications Sciences and Technology Division, SRI International, pp. 1–35 (1989).

C.S. Wu et al, "Receiver–Initiated Busy–Tone Multiple Access in Packet Radio Networks", Frontiers in Computer Communications Technology, Stowe, VT, Aug. 11–13, 1997, Computer Communication Review vol. 17, No. 5 Special Issue, pp. 362–342.

Phil Karn, KA9Q, "MACA–A new Channel Access Method for Packet Radio", pp. 5 total, (1990).

* cited by examiner ively to transmit data packets without collisions. Transmis-
TRANSMISSION-SCHEDULING COORDINATION AMONG COLLOCATED INTERNET RADIOS This application claims the benefit of U.S. Provisional Application No. 60/230,395, filed Sep. 6, 2000.

FIELD OF THE INVENTION

The present invention relates to the scheduling of transmissions without collisions in ad hoc networks with radio links in which routers can have both hosts and networks attached to them, and where some routers with wireless interfaces are collocated and receive conflicting transmission schedules from wireless neighbors.

BACKGROUND

Ad hoc networks (i.e., multi-hop packet radio networks) are computer networks in which routers are connected with wireless links. In ad hoc networks, nodes (stations or packet radios) can be mobile and communicate with one another either directly or through intermediate nodes, without relying on any pre-existing network infrastructure.

Many medium-access control (MAC) protocols have been developed for wireless networks. These protocols can be classified as contention-based and schedule-based protocols.

In a contention-based protocol, a node contends for access to the channel on a packet-by-packet basis. This is accomplished by either sending data packets to the channel or by means of a collision-avoidance handshake using small control packets. Examples of the former type of protocols are ALOHA, CSMA, BTMA, CSMA/CD. Examples of collision-avoidance protocols proposed to date include those disclosed in U.S. Pat. Nos. 5,319,64, 4,661,902, 5,231,634, 5,502,724, and 5,721,725. Additional examples include, IEEE802.11, floor acquisition multiple access with nonpersistent carrier sensing (FAMA-NCS), receiver intitiated multiple access (RIMA), and multiple access collision avoidance (MACA).

Two key performance limitations of all contention-based protocols, including all collision-avoidance MAC protocols over single or multiple channels are that: (a) they cannot provide channel-access delay guarantees, and (b) they lack explicit support of collision-free multicasting or broadcasting.

To provide delay guarantees and collision-free broadcasting and multicasting, network nodes can use a known transmission schedule or establish such a schedule dynamically to transmit data packets without collisions. Transmission schedules are-established for time periods that are much longer than the duration of a single data packet or just a few data packets. In a transmission schedule, nodes are allowed to transmit at different times and on different data channels (e.g., frequencies, spreading codes, or their combination) in a way that no collisions occur.

The limitations of fixed transmission scheduling are the inability to adapt to network changes and inefficient use of the channel if nodes are bursty sources of traffic.

There are many approaches in the prior art based on dynamic transmission scheduling methods in which stations use ALOHA, slotted ALOHA or other contention-based protocols in an uplink to request time slots from a base station. An example of this approach is the system disclosed in U.S. Pat. No. 5,638,371. A number of protocols have been proposed in the recent past to provide dynamic time-slot allocation without requiring central base stations. These protocols can be classified as topology-independent and topology-dependent time scheduling protocols.

Shepard, "A Channel Access Scheme for Large Dense Packet Radio Networks," SIGCOMM '96 Conference Proc., ACM 1996, "Scalable, Self-Configuring Packet Radio Network Having Decentralized Channel Management Providing Collision-Free Packet Transfer," U.S. Pat. No. 5,682, 382, Oct. 28, 1997; Chlamtac et al., Chlamtac, W. R. Franta, and K. D. Levin,"BRAM: The Broadcast Recognizing Access Method," IEEE Trans. Commun., vol. COM-27, pp. 1183–89, 1979, "Fair Algorithms for Maximal Link Activation in Multihop Radio Networks," IEEE Transactions on Communications, Vol. COM-35, no. 7, July, 1987, "Time-Spread Multiple-Access (TSMA) Protocols for Multihop Mobile Radio Networks," IEEE/ACM Transactions on Networking, Vol. 5, no. 6, December, 1997; and Ju and Li, Ji-Her Ju, Victor O.K. Li, "An Optimal Topology-Transparent Scheduling Method in Multihop Packet Radio Networks," IEEE/ACM Transactions on Networking, Vol. 6, no. 3, June 1998, have proposed topology-independent time-scheduling protocols. The protocols proposed by Ephremides and Truong, A. Ephremides, T. Truong, "Scheduling Broadcasts in Multihop Radio Networks," IEEE Transactions on Communications, Vol. COM-38, No. 4, April, 1990; Corson, C. Zhu, M. S. Corson, "A Five-Phase Reservation Protocol (FPRP) for Mobile Ad Hoc Networks," Proc. IEEE INFOCOM '98; Young, C. D. Young, "USAP: A Unifying Dynamic Distributed Multichannel TDMA Slot Assignment Protocol," [apple87] U.S. Pat. No. 4,661,902, April 1987; and Tang and Garcia-Luna-Aceves, Z. Tang and J. J. Garcia-Luna-Aceves, "Hop-Reservation Multiple Access (HRMA) for Multichannel Packet Radio Networks", Proc. IEEE IC3N '98: Seventh International Conference on Computer Communications and Networks, Lafayette, La., Oct. 12–15, 1998 are examples of topology-dependent scheduling protocols, such that a node acquires a transmission schedule that allows the node to transmit without interfering with nodes one and two hops away from itself, and such that channel reuse is increased as the number of neighbors per node decreases. Robust Environmentally Aware Link and MAC) (REALM) is another example of topology-dependent transmission scheduling; in this protocol, control packets used to exchange transmission schedules are transmitted.

A common feature of all the schedule-based protocols in the prior art consists of assuming that each node has a single radio interface to the wireless network, or that the radios used by a single node (e.g., a base station) operate in orthogonal channels, such as a downlink and an uplink channel in the case of a base station. In practice, however, multiple radio interfaces may be required at a single node to connect to the appropriate nodes in its neighborhood by means of multiple radio transceivers and directional antennas. In addition, two or more nodes with a single transceiver may be located near one another and be connected through a wired interface or a wired LAN. We refer to all these cases as collocated nodes. Collocated nodes present a new problem for the establishment and maintenance of transmission schedules dynamically, because the schedules that they receive from other nodes over wireless channels may be in conflict with one another, simply because different nodes may have radio connectivity with different collocated nodes.

SUMMARY OF THE INVENTION

The present invention consists of a method for collocated nodes communicating over a first interface to agree on a conflict-free transmission schedule among themselves, which they can then use to collaborate with neighbors accessed through a second interface, for example through wireless links in order to obtain collision-free transfers of unicast, multicast and broadcast packets over wireless channels, and channel access delay guarantees. The present invention makes the collocated nodes behave as a single virtual node for the purpose of establishing a consistent transmission schedule throughout the nodes of a multihop wireless network.

An embodiment of the present invention is implemented as the Collocated Neighborhood Established Transmission Scheduling protocol (CONETS) because it enables the nodes of an ad hoc network that are collocated and linked through wired media (a LAN or a wired link) to compute a single collision-free transmission schedule among themselves that they can then use to coordinate with other neighbors over wireless links to obtain collision-free transmission. In an embodiment of the invention, CONETS is used in combination with a dynamic transmission-scheduling protocol for multihop wireless networks, such as Neighboring Established Transmision Scheduling (NETS), described in commonly assigned U.S. patent application Ser. No. 09/418,899, filed Oct. 15, 1999, and incorporated by reference herein.

CONETS assumes that collocated nodes must generate a common schedule to be used for a synchronous wireless network in which transmission times are organized into frames divided into slots. The amount of synchronization required in such a wireless network is the same type of synchronization required in any network operating with frequency hopping radios, such as those designed to operate in ISM bands and commercially available today.

A deterministic scheduling algorithm in CONETS allows all the collocated nodes connected together through a LAN or wired link to agree on the same transmission schedule after the reliable exchange of schedule packets with one another. Each collocated neighbor of a node acknowledges the schedule packet sent by the node; this acknowledgment can be sent either as a separate packet or as part of a schedule packet. Collocated nodes exchange CONETS schedule packets during a frame to derive a common schedule that takes effect for the transmission of data over wireless channels during the following frame. In addition to schedule packets, collocated nodes also transmit hello packets to inform their collocated neighbors of their existence, without having to send long schedule packets. The transmission of CONETS depends on the definition of the frames used in the radio channel(s) of the ad hoc network only in that such packets must be sent within the duration of a given frame and result in transmission schedules used by nodes to transmit over the wireless channel(s) of the ad hoc network that take effect starting with the following frame.

A CONETS schedule packet provides a summary description of the two-hop neighborhood of a node in terms of: all the known nodes in the two-hop neighborhood of the transmitting node, the incoming and outgoing collision-free links of the node that have already been scheduled, the time slots and data channels where new links with the node can be reserved, and the time slots and data channels where the node will be listening while not active in scheduled links. A CONETS acknowledgment packet is sent in response to a CONETS schedule packet. A CONETS hello packet simply states the identifier of the sending node and refers to the last schedule packet sent by the node. A CONETS hello-response packet is sent to correct the sequence number used by the sender of a CONETS hello packet to indicate what the latest schedule packet is.

DETAILED DESCRIPTION

A system for the establishment of a common schedule among collocated nodes for collision-free unicast, multicast, and broadcast transmissions in ad hoc networks according to an embodiment of the invention is disclosed herein. In the following description, numerous specific details are set to provide a thorough understanding of the present invention. However, it will be evident to those skilled in the art that these specific details need not be used to practice the present invention and alternative embodiments are possible. In other cases, well-known structures and circuitry have not been shown in detail to avoid unnecessarily obscuring the present invention.

The present scheduling protocol disclosed according to an embodiment will be referred to as the Neighborhood Established Transmission Scheduling (CONETS) protocol, because it enables all nodes that are members of an ad hoc network and collocated over a wired link or local area network (LAN) to obtain the exact same transmission schedule and interact with other nodes in the ad hoc network as if they were a single node for the purpose of building transmission schedules dynamically. The scheduling rules followed by collocated nodes are such that no collocated node is allowed to transmit while one of its collocated neighbors is attempting to receive data.

The novelty of the present invention results from combining a novel deterministic algorithm for selecting the node that should be allowed to transmit in a given time, together with a novel reliable exchange of schedule information among collocated nodes over the wire or LAN used to interconnect them.

I. Basic Service and Architecture

Figure 1:
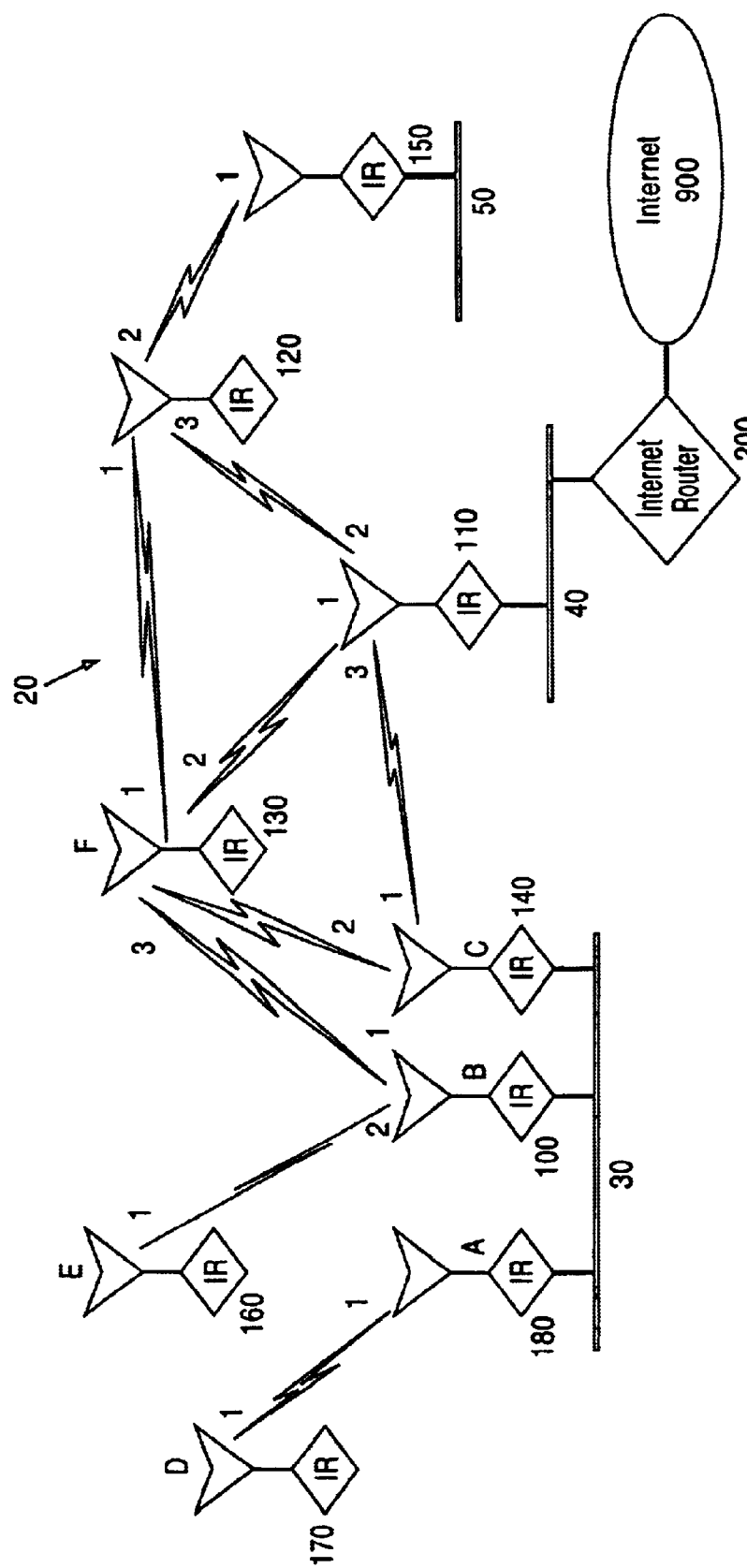
FIG. 1 illustrates an ad hoc network according to an embodiment of the invention.

FIG. 1 illustrates aspects on an exemplary ad hoc network with collocated nodes according to an embodiment of the invention. The ad hoc network depicted in the figure consists of a number of subnetworks 30, 40, 50, which provide an extension of the Internet through a number of internet radios (IRs) 100, 110, 120, 130, 140, 150, 160, 170, 180. Each IR 100–180 is a wireless router with an IP address and a MAC address. The ad hoc network attaches to the Internet 900 via an access point, called "AirHead," which comprises IR 110 interconnected to an Internet router 200 through local area network 40. IR 100, 140, and 180 are collocated through LAN 30, and the transmission schedule that IR 100 communicates to its non-collocated neighbors (IR 160 and IR 130) must be the same as the schedule that IR 140 communicates to Ks non-collocated neighbor IR 110, and IR 180 communicates to its non-collocated neighbor IR 170. IR 100, 140, and 180 agree on the same transmission schedule using the CONETS protocol. The packets that pertain to the CONETS protocol are exchanged among IR 100, 140 and 180 over LAN 30 only. The channel access protocol used to support CONETS depends only on the transmission media of LAN 30.

CONETS packets are sent asynchronously over the link or LAN interconnecting collocated nodes. However, for the purpose of deriving a transmission schedule to be used over a set of wireless channels, CONETS assumes that time over the wireless channel(s) used is slotted and that slots are grouped into frames. The duration of a slot and a frame is configured in a node. We also assume that multiple orthogonal data channels are available; these channels can be implemented by means of multiple frequency bands, direct-sequence or frequency-hopped spreading codes, or combinations of waveforms that combine such techniques.

To describe the operation of CONETS, the term active scheduled link (ASL) is used to denote a reserved sequence of contiguous time slots with a specific start slot and an associated data channel, where a data channel can be a spreading code, a frequency hop sequence, a frequency band, a data rate, and combinations of these and other transmission parameters.

Slots are allocated to ASLs on multiples of link units, where a link unit is the minimum number of contiguous slots that a non-empty ASL can require. Hence, the slot range of an ASL is a multiple of link units. Furthermore, the start slot of an ASL must be a number that is a multiple of link units. This is done to avoid orphan slots that cannot be allocated to any ASL.

We note that an ASL specified for unicast transmissions has a transmitter and a receiver, and an ASL for multicast or broadcast transmissions has a transmitter and multiple receivers.

Nodes can be identified by their MAC addresses or any type of identifier allowing a node to denote any of its collocated neighbors unambiguously. In the description of the embodiment of the invention presented herein, we simply use the term node identifier to denote the identifier used among collocated neighbors. A node can have any number of collocated neighbors over one or multiple wired transmission media. The node uses CONETS over each interface with collocated nodes to agree with all such neighbors on a common transmission schedule, which makes all collocated nodes act as a single node for the purpose of scheduling transmissions with other nodes over wireless links of a multihop wireless network.

Collocated nodes exchange schedule packets, acknowledgments to such schedule packets, hello packets that refer to prior schedule packets, and hello-response packets designed to correct the information being used by a collocated neighbor.

Figure 2:
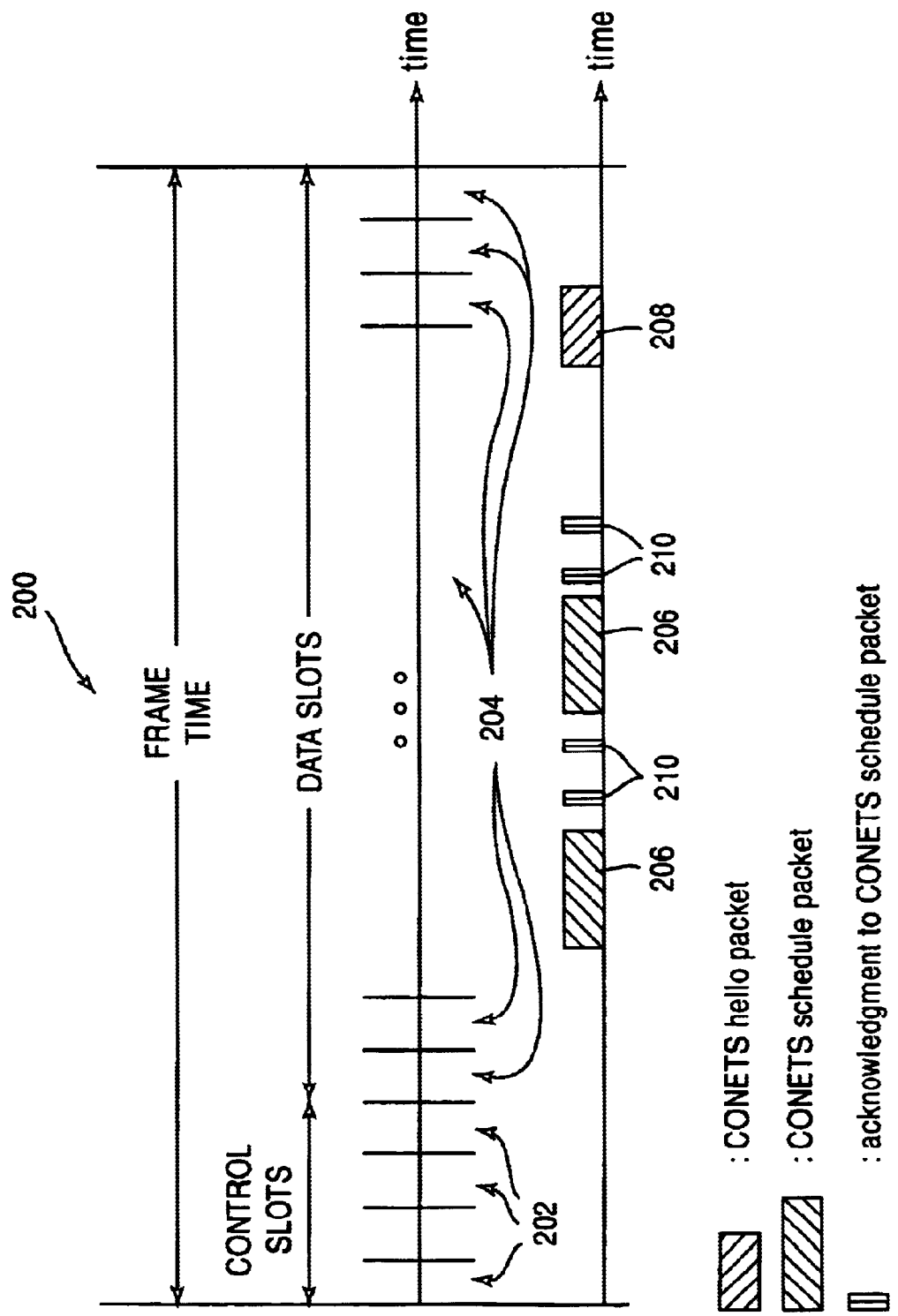
FIG. 2 illustrates a frame utilized to transmit packets according to an embodiment of the invention.

In one preferred embodiment of the present invention, CONETS is used in combination with Network Established Transmission Scheduling (NETS) and Robust environmentally Aware Link and MAC (REALM), which are described in commonly assigned U.S. patent applications Ser. No. 09/418,899, filed Oct. 15,1999 and No. 09/248,738 filed Feb. 10, 1999, assigned to the Assignee of the present invention and incorporated herein by reference. In this embodiment, REALM is used to determine when NETS schedule packets are sent periodically by each node, depending on its two-hop neighborhood. According to REALM, time is divided into frames of a known number of slots, and each frame is assigned a number that is known throughout the network. As illustrated in FIG. 2, the first few slots of each frame 200 are dedicated to the transmission of NETS schedule packets, and such slots are called control slots 202. The rest of the frame 200 is used for the transmission of data; the slots in the remaining of the frame 200 are called data slots 204. CONETS packets are exchanged over a wired link or a LAN by collocated nodes during the time of the frame 200 assigned for the transmission of data over the wireless channels. The transmission of CONETS schedule packets 206 is accomplished using a channel access protocol suitable for the transmission media used to interconnect the collocated nodes; for example, if the LAN interconnecting the collocated nodes is an Ethernet, carrier sense multiple access with collision detection (CSMA/CD) is used for the transmission of CONETS packets over it. FIG. 2 illustrates the case in which two of the collocated IRs in LAN 30 of FIG. 1 send schedule packets 206 and one of them sends a hello packet 208 during a given frame; the figure also illustrates the fact that CONETS packets are not transmitted synchronously with respect to the frame assumed for the transmission of packets over the wireless channel available.

Establishing schedules in CONETS is based on the following principles:

(a) Each node must advertise its transmission schedule to all its collocated neighbors, so that they can agree on the same version of the schedule, and each collocated node is capable of processing CONETS packets received over a LAN or wired link while it sends or receives data packets over one or more wireless links.

(b) Data from a source must flow without interference from other sources over a reserved ASL, until conflicts due to mobility, errors due to the physical link, or the end of the flow are detected. Because of possible hidden terminals, the receiver(s) of an ASL must tell potential sources that the ASL is reserved.

(c) Links must be established over multiple available data channels. Because of possible hidden terminals, both sender and receiver(s) of a link must decide that the intended ASL does not interfere with other ongoing ASLs.

(d) Each node receives an explicit acknowledgment 210 to its transmitted schedule from each collocated neighbor in a LAN or wired link.

(e) ASLs proposed or established by neighbors accessed through a wireless link have precedence over proposed ASLs from any of the collocated nodes to another node.

(f) Collocated nodes can communicate with one another over a wired transmission medium, with no need for establishing an ASL over a wireless channel.

CONETS provides two basic services: maintaining the set of collocated neighbors of a node over a given wired interface, and establishing a common transmission schedule among all those collocated nodes. Using CONETS, a set of collocated nodes appear to their neighbors as a single node with is multiple node identifiers and capable of receiving or transmitting over multiple orthogonal channels concurrently, without being able to both transmit and receive at the same time over any channel.

FIG. 3 shows a flowchart outlining a preferred embodiment of CONETS in which REALM and NETS are used to schedule the transmission of packets into the radio channel (s) of an ad hoc network. An important assumption in this embodiment is that a node can receive the acknowledgments (ACKs) to any CONETS schedule packet from its collocated neighbors within the same frame.

II. Information Exchanged and Maintained in CONETS

Figure 4:
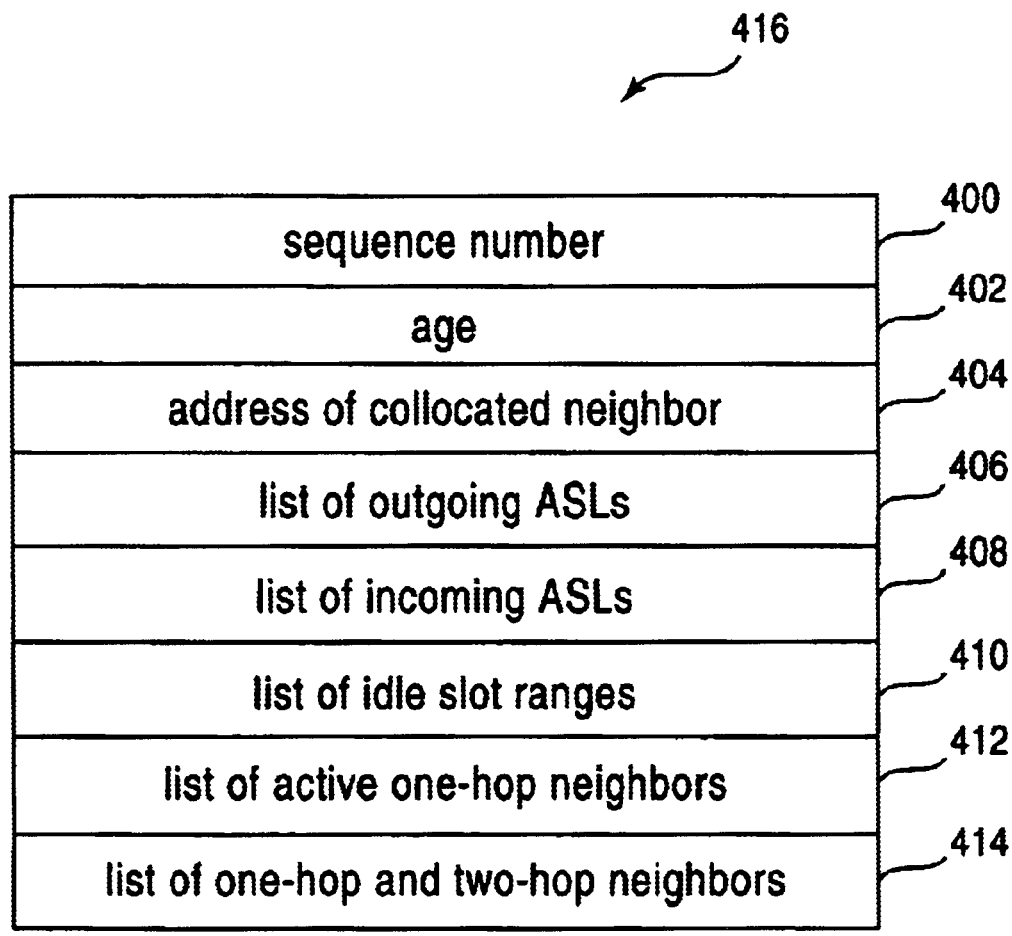
FIG. 4 illustrates the format of a schedule packet according to an embodiment of the invention.

FIG. 4 presents the format of a canonical CONETS schedule packet 416, which illustrates the combination of the various types of information used in the present invention. Fields in the canonical format are assumed to be required fields. The type of information conveyed in the schedule packets used in the embodiment of the present invention is the same as schedule information conveyed in NETS schedule packets. A CONETS schedule packet specifies the transmission schedule and neighbor information known to the node and consists of:

a) The sequence number 400 and age 402 of the schedule packet.
b) The address of a collocated neighbor 404 that should send an ACK for the packet; a broadcast address (i.e., "all collocated neighbors") is used when new schedule information is reported.
c) A list of one or more outgoing ASLs 406, which specify ASLs used for the node to transmit to its neighbors; each such ASL is specified by:
   The node identifier assigned to the neighbor in the ASL
   The start slot of the ASL
   The slot range occupied by the ASL
   The data channel used for the ASL
   The frames to live for the ASL (FTL)
   A bit indicating if the ASL is established (0) or requested (1)
   A schedule priority ticket whose value is picked by the node
d) A list of one or more incoming ASLs 408, which specify ASLs used for neighbors to transmit to the node; each such ASL is specified by:
   The node identifier assigned to the node by its neighbor in the ASL
   The start slot of the ASL
   The slot range occupied by the ASL
   The data channel used for the ASL
   The frames to live for the ASL (FTL)
   A request bit indicating if the ASL is established (0) or requested (1)
   A schedule priority ticket whose value is picked by the neighbor
e) A list of zero or more idle slot ranges (ISR) 410, with each ISR specified by:
   The start slot of the ISR
   The slot range of the ISR
   The data channel used for the ISR
   A bit indicating if the node is listening on the ISR
   A schedule priority ticket whose value is picked by the node
f) A list of one or more active one-hop neighbors 412, with each entry in the list consisting of:
   The MAC address of a neighbor
   The XLID given by the node to the link with the neighbor
   The RLID given by the neighbor to the link with the node
g) A list of zero or more MAC addresses of one- and two-hop neighbors 414.

For simplicity, it is assumed that ASLs and ISRs are specified in an order defined by their start slots, with the ASL and ISR with the smallest start slot number going first in the respective list.

Slot ranges are specified in terms of link units. The schedule priority ticket is a random number used by nodes to determine which requested ASL (i.e., an ASL with request bit set to 1) asking for slots and a channel that overlap at least partially with other requested ASLs should win. The preferred embodiment of the present invention would follow the simple rule that the proposed ASL with the smallest ticket value is assigned the slots and channel requested.

Outgoing and incoming ASLs sent in a CONETS packet are either links agreed upon by all the nodes in a two-hop neighborhood, or they can be proposed links requested by nodes. ISRs have lower priority than established or requested ASLs and are used for nodes to execute quick transactions and to indicate to nodes receiving a CONETS schedule packet the slot ranges and associated channels that can be used to request ASLs with a given neighbor.

In the preferred embodiment of the present invention, an acknowledgment (ACK) to a CONETS schedule packet specifies the node identifier of the sender of the CONETS packet, the node identifier of the receiver of the CONETS packet, the sequence number of the CONETS packet, and a flag indicating whether the node sending the ACK agrees or disagrees with the schedule proposed in the CONETS packet. In an alternative of the preferred embodiment of the present invention, ACKs to CONETS schedule packets are included as part of a CONETS packet in a list of ACKs. In this case, each item in such a list consists of the sequence number of a CONETS packet, the node identifier of the sender of the CONETS packet being acknowledged, and a flag indicating a positive or negative acknowledgment.

Figure 5:
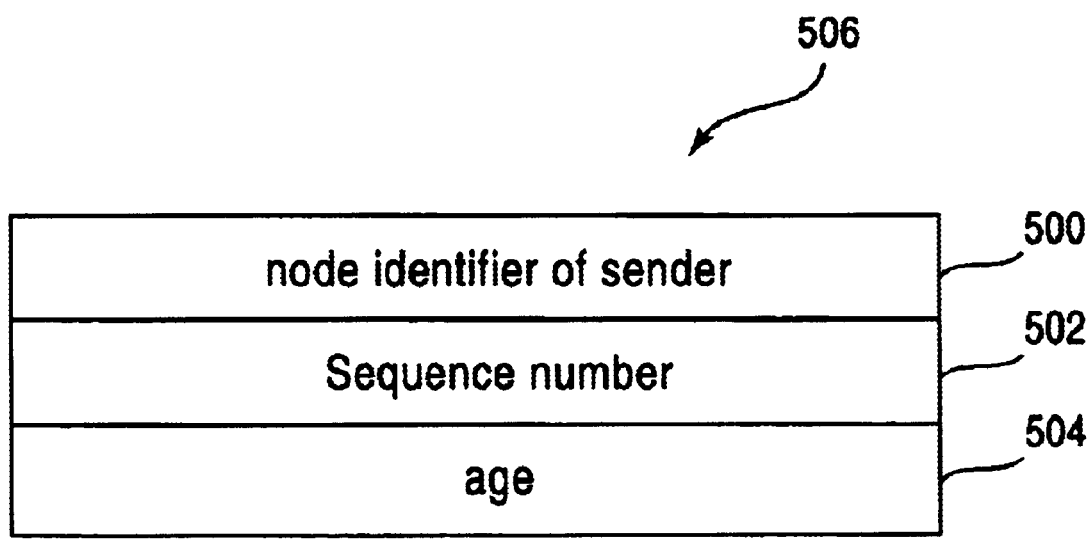
FIG. 5 illustrates the format of a hello packet according to an embodiment of the invention.

FIG. 5 shows the canonical format of a CONETS hello packet 506, which specifies the node identifier of the sender of the packet 500, the sequence number 502 and the age of the packet 504. The sequence number of a hello packet is the same sequence number of the last schedule packet used to report changes in the assumed schedule. The age field specifies a timeout during which the schedule information is valid.

Figure 6:
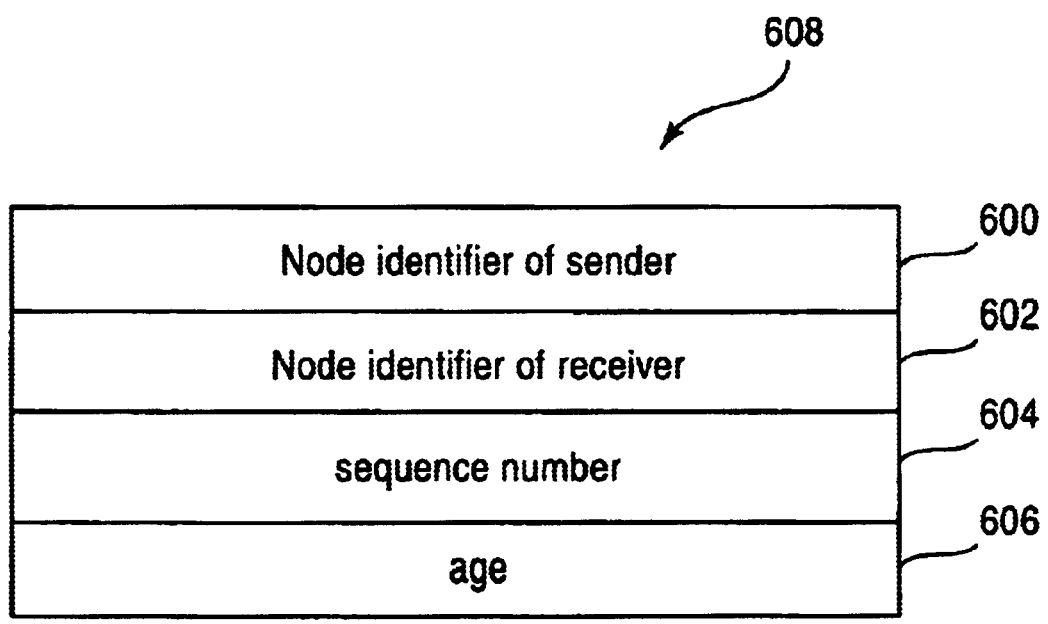
FIG. 6 illustrates the format of a hello-response packet according to an embodiment of the invention.

FIG. 6 shows the canonical format of a CONETS hello-response packet 608, which specifies the node identifier of the sender of the packet 600, the node identifier of the intended recipient of the packet 602, and the sequence number 604 and age 606 that the sending node has previously received from the intended receiver of the packet.

The information a node maintains about its two-hop neighborhood consists of:
(a) The MAC addresses and associated node identifiers of all its one-hop neighbors, including its collocated neighbors.
(b) The ASLs advertised by all its non-collocated one-hop neighbors.
(c) The ISRs advertised by all its non-collocated one-hop neighbors.

The aggregate of ASLs constitutes the working schedule of the two-hop neighborhood of a node, and the ISRs constitute the choices the node should first try to use to request new ASLs with neighbors. All collocated neighbors agree on the same schedule for themselves.

A node maintains a hello entry for each collocated neighbor specifying the node identifier of the neighbor and a timer; the value of the timer is updated with the reception of a hello or schedule packet from the corresponding collocated neighbor.

III. Maintaining Collocated Neighbors

A node detects the presence of its collocated neighbors over a LAN or wired link by means of schedule packets and hello packets transmitted over the medium used to interconnect the collocated nodes. A node maintains a hello entry for each collocated neighbor; each entry specifies the node identifier of a neighbor and an age timer that determines the remaining time that the collocated neighbor and its schedule information can be assumed to be valid. The age of each hello entry is reduced each predefined unit of time, and a node determines that a collocated neighbor is not reachable through a wired link or LAN when the hello entry for the collocated neighbor reaches a zero age. A node deletes a collocated neighbor from its data structures when the information for the neighbor ages out locally, that is, the node decrements the age of a collocated neighbor down to zero.

In the preferred embodiment, the unit of time used for aging equals one frame or multiple frames; this choice renders small age fields and permits a node to decrement the age of a collocated neighbor only once a frame or once every number of frames. A node maintains a hello counter for itself and an age counter for each collocated neighbor. A node then resets its hello counter to its maximum value each time it sends a hello or CONETS schedule packet. A hello packet specifies the node identifier of the sending node, the sequence number of the last schedule packet sent to its collocated neighbors, and an age field specifying the period of time for which the schedule information referenced in the hello is valid.

Figure 3A:
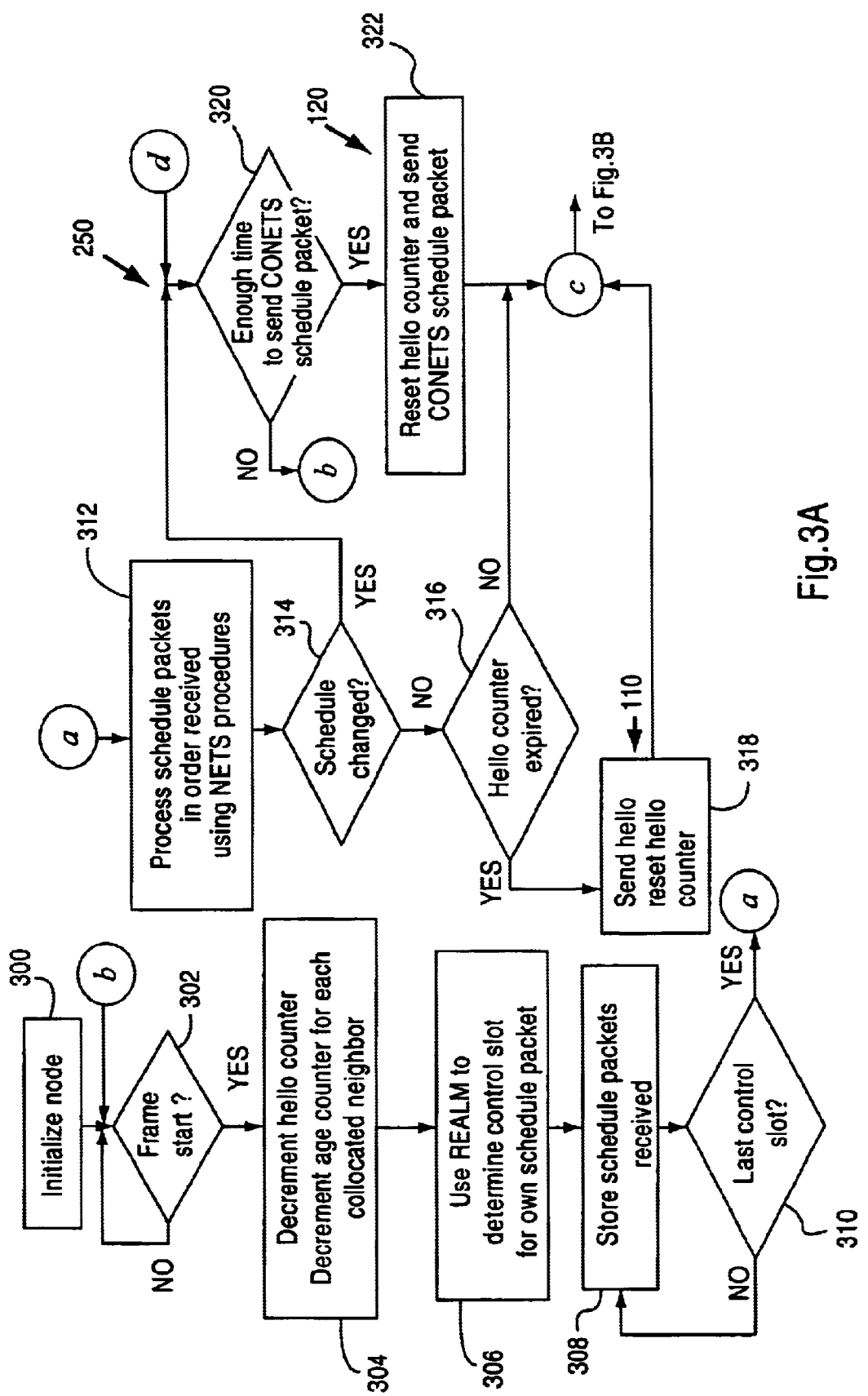
FIGS. 3A and 3B are flowcharts illustrating process steps of scheduling transmission of packets according to an embodiment of the invention.
Figure 3B:
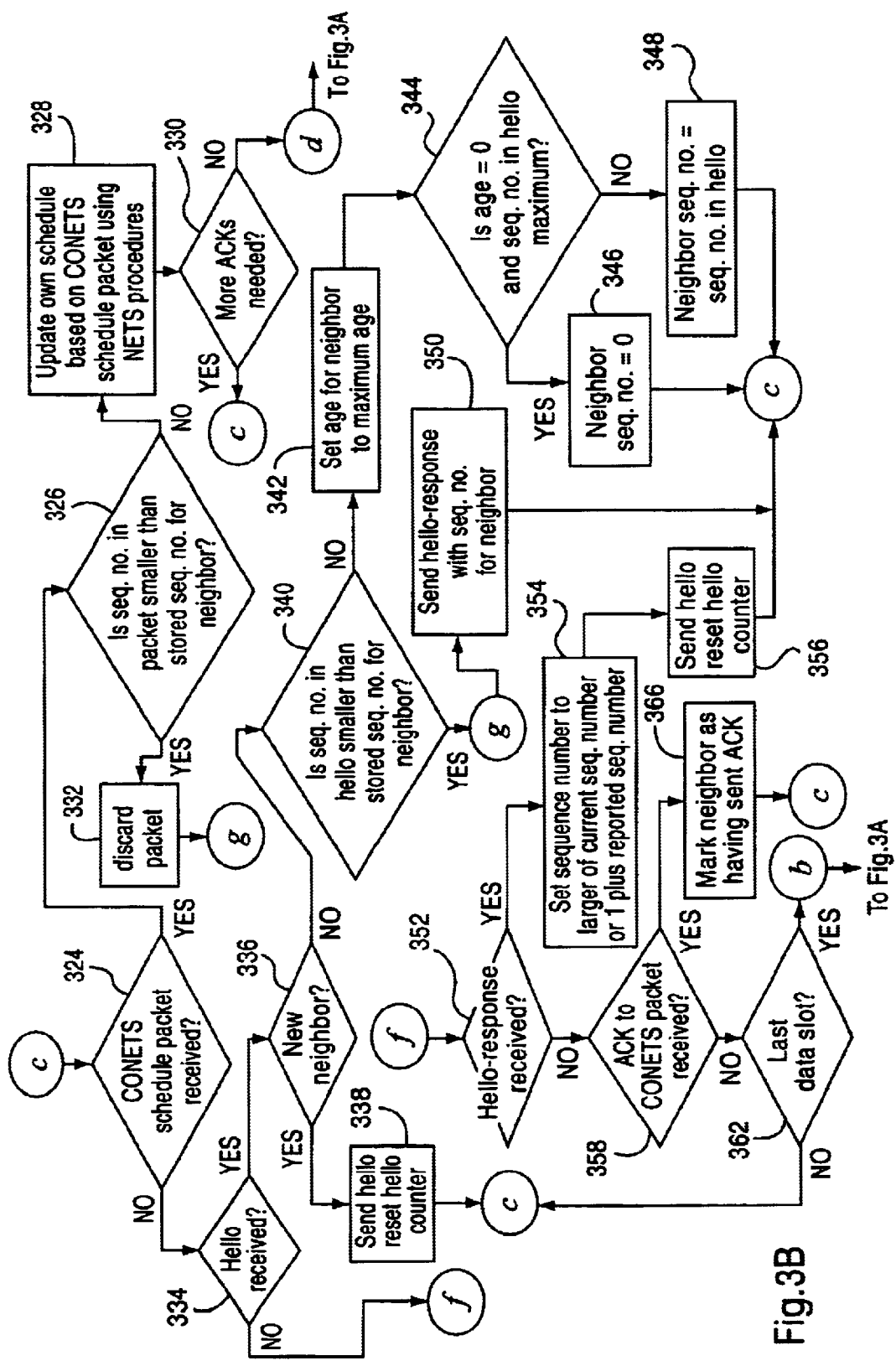

Referring now to FIG. 3a, after initializing, 300, and at the beginning of each frame 302, the node decrements its hello counter and the age counter of each of its collocated neighbors, 304. In the preferred embodiment of the present invention, the CONETS protocol is used together with NETS and REALM, and a collocated node can only transmit a schedule packet during the control portion of a frame to report the schedule i agreed upon with its collocated nodes during the data portion of the previous frame. As FIGS. 3A and 3B show, REALM is used in CONETS to determine in which control slot a node can transmit its schedule to its non-collocated neighbors over the wireless channel 306, a node then processes the frame to receive and store schedule packets from other nodes 308–310. Next the schedule computation procedures of NETS are used to process the schedule packets, 312.

A node with collocated neighbors, therefore, receives the schedule packets during the control portion of a frame from neighbors with which it has radio connectivity, processes all such schedule packets according to Etiquette rules 1 to 10 using the same procedures disclosed for the NETS, and sends a CONETS schedule packet over the wired link or LAN to its collocated neighbors during the data portion of the frame. During the date portion of the frame, a node with collocated nodes may receive CONETS schedule packets, hello packets, acknowledgment packets, and hello-response packets. The schedule of a node can be modified by CONETS schedule packets and loss of connectivity with a collocated node.

As FIG. 3A illustrates, after processing the schedule packets, 312, and determining that the schedule has changed, 314, a node transmits a CONETS schedule packet, 320, only if there is sufficient time left in the frame to receive all the acknowledgments from its collocated neighbors, 320. If the node transmits the CONET packet, the hello counter is reset, 322. If the node does not transmit a CONET package, the process begins again at the next frame start, 302. For simplicity, the event corresponding to the loss of a collocated neighbor is not shown in FIG. 3. However, this event can be interpreted in the pseudocode presented in FIG. 3 as the reception of a virtual schedule from the collocated node that becomes disconnected containing no ASLs and ISRs. The reception of the node's hello at a collocated neighbor restarts the timer used by the neighbor to delete schedule information reported by the node. Accordingly, a node that has no schedule modifications during a given frame, 314, sends a hello packet during the frame, 318, if it has not sent any hello or schedule packet for a period of time proportional to the maximum age allowed for a collocated node to remain valid according to its hello counter, 316.

The sequence number used to determine the most up to date schedule received from a collocated neighbor may need to be recycled. Even if a large sequence number space is used (e.g., 32 bits can be used to denote a sequence number), a node may need to recycle the sequence number it uses for its transmission schedule after it reboots following a failure. The following steps are followed to ensure that the most recent transmission schedule from a node is accepted as such by all its collocated neighbors.

To start a safe recycling of sequence numbers in the presence of failures, a node that reaches the maximum allowed sequence number sends a hello with the maximum sequence number and an age of 0, which instructs its collocated neighbors to prepare to accept a smaller sequence number for the node.

Referring now to FIG. 3B, therein are process steps used at a node to process hellos or CONETS schedule packets received from collocated nodes at 318 and 322, respectively, of FIG. 3A.

A node that receives a hello packet, 334, from a collocated neighbor, through 324 and 334, that is determined new and not known previously, 336, transmits a Hello packet, 338, to the collocated neighbor even if it has no schedule changes to report; the Hello packet functions as a schedule packet that specifies the node identifier of the new collocated neighbor as the node that must acknowledge the schedule packet, and the sequence number of this schedule packet is the same as the last sequence number acknowledged by other collocated neighbors.

A node that is started or rebooted is initialized with an empty transmission schedule and therefore sends a hello packet with a zero sequence number and the maximum allowed age.

As shown in FIG. 3, when node Y (not shown) receives 340 a hello from a collocated neighbor X (not shown) in which the sequence number used by the sending node X (not shown) is smaller than the sequence number stored at the receiving node Y for the sending node, 340, then node Y sends a hello-response packet to node X specifying the sequence number and age locally available at node Y for its collocated neighbor X, 350. In turn, when node X receives through 324, 334, a hello-response packet addressed to it, 352, it increases its sequence number to equal the maximum of its current sequence number and one plus the sequence number received in the hello-response packet from node Y, 354; after that, node X sends a hello with the resulting sequence number, 356. If a hello-response is not received, 352, node X, and an ACK to CONET packet is received, 358, node X marks node Y as having sent the ACK 360. If an ACK is not received, 358, and if more data slots are available to receive appropriate CONETS packets, 362, node X determines whether map packets are to be received. Taking these steps ensures that node X uses sequence numbers for its hello and schedule packets that all its collocated neighbors can assume to be the most recent from node X. As shown in FIG. 3, if node Y receives, through 324, 334, 336, 340, 342, a hello with a zero (0) age and the maximum sequence number allowed from a collocated neighbor X, 344, it then locally assigns a zero (0) sequence number and a maximum age to node X, 346; this allows node Y to maintain the last schedule reported by X while it transmits a subsequent hello or schedule packet reliably with a sequence number equal to 1, otherwise it assigns a sequence number equal to the sequence number in the hello, 348.

As shown in FIG. 3, when node Y receives, through 324, a CONETS schedule packet from a collocated neighbor X in which the sequence number used by the sending node X is smaller than the sequence number stored at the receiving node Y for the sending node, 326, then node Y discards the packet, 332 and sends a hello-response packet to node X with the sequence number stored for X at node Y, 350. If node Y receives a CONETS schedule packet otherwise, it updates its own schedule based on CONETS schedule packet using NET procedures, 328.

IV. Establishing Common Transmission Schedules

For convenience, we refer to all the data that must be transmitted by a node to one or multiple neighbors over a given ASL as a flow. Data packets in the same flow, therefore, can be addressed to different network-level destinations sharing the same relay next node. The scheduling of such packets over an ASL is outside the scope of this invention. However, it should be apparent to those skilled in the art that the ASLs established in CONETS tend to be longer lasting than individual connections, therefore, because they service multiple connections.

Because nodes in a two-hop neighborhood may have inconsistent scheduling information and send out their requests for ASLs concurrently, more than one requested ASL sent by nodes during the same frame may specify conflicting slot ranges, data channels or intended receivers. The establishment of a common transmission schedule for all collocated nodes using CONETS is based on a simple distributed election method based on a novel etiquette of channel reuse. In one preferred embodiment of the present invention, a node listens for REALM control packets during the first few slots of a frame and uses the rest of the frame to exchange CONETS schedule packets with its collocated neighbors; the common schedule agree upon by the node and all its collocated neighbors takes effect at the beginning of the next frame. In another preferred embodiment of the present invention, a node exchanges CONETS schedule packets with its collocated neighbors based on schedule information received during the prior frame from non-collocated neighbors, and the common schedule agreed upon by the node and its collocated neighbors takes effect at the beginning of the next frame.

CONETS bases the scheduling of transmissions on a set of etiquette rules, which are an extension of the rules defined for the NETS protocol. The modifications to the NETS etiquette allow two or more collocated nodes to transmit or receive concurrently over orthogonal channels, and prevent a collocated node from transmitting while any of its collocated neighbors is receiving. The CONETS etiquette consists are the following:

Etiquette Rule 1: The schedule assumed by all the collocated nodes in the same LAN or wired link takes effect in the frame following the frame during which CONETS schedule packets are exchanged.

Etiquette Rule 2: An incoming or outgoing ASL already established has precedence over any requested ASL that conflicts with the established ASL.

Etiquette Rule 3: For any requested ASLs that conflict with one another, the following precedence rules must be observed:

3*a*) ASLs received from non-collocated neighbors have precedence over ASLs received from collocated neighbors and ASLs requested by the node itself.

3*b*) ASLs for broadcast transmissions have precedence over ASLs for multicast or unicast transmissions.

3*c*) ASLs for multicast transmissions have precedence over ASLs for unicast transmissions.

3*d*) Among the ASLs with the same precedence due to the type of transmission, the ASL with the smallest schedule priority ticket has precedence.

Etiquette Rule 4: The following precedence rules must be observed for nodes and collocated nodes that work in half-duplex mode:

4*a*) No ASL to or from a given node may overlap on any time slot with another ASL to or from the same node.

4*b*) No ASL from any collocated node may overlap any ASL to any of its collocated neighbors on any time slot.

4*c*) ASLs from collocated node peers using identical channels must not overlap on any time slot.

Etiquette Rule 5: The slots of an ASL must be contiguous and the same data channel must be used for the entire ASL.

Etiquette Rule 6: ASLs have precedence over ISRs, and between two ISRs that use the same channel and overlap in at least one time slot, the ISR with the smallest schedule priority ticket has precedence.

Etiquette Rule 7: During any given time slot assigned for data transmission, a node that is not transmitting or receiving on an established ASL must be listening in one of its advertised ISRs.

Etiquette Rule 8: When node i needs to establish a new ASL with a neighbor j, it must choose one of the advertised ISRs from j without creating any conflict with any other etiquette rules.

Etiquette Rule 9: A node can transmit only over established ASLs.

Etiquette Rule 10: Transmissions over an advertised ISR must be done using a listen-before-talk etiquette over the channel specified for the ISR.

Etiquette Rule 11: A node can announce a new ASL to or from the node itself to its non-collocated neighbors only after all its collocated neighbors have agreed to include the ASL in the common transmission schedule maintained by all collocated nodes.

All the valid ASLs constitute the working schedule of the node. The working schedule of node i is denoted by WS_i. The valid ISRs constitute the feasible schedule of the node. The feasible schedule of node i is denoted by FS_i. Node i updates WS_i and FS_i when it receives a CONETS schedule packet from a collocated neighbor, or a schedule packet from a non-collocated neighbor. Schedule packets and CONETS schedule packets are received in different portions of a frame. In one preferred embodiment, the first few slots of a frame are dedicated to the exchange of schedule packets among neighbors with radio connectivity with one another. The rest of the frame can then be used over a wired link or LAN by collocated nodes to exchange CONETS schedule packets. FIG. 2 illustrates the structure of the frame in such an embodiment.

To update WS_i, node i applies etiquette rules 1 to 11 on each of the updated ASLs or new ASLs reported in a CONETS schedule packet to determine which are valid ASLs among all those reported by its neighbors and the ASLs originated by the node itself. Given Etiquette Rule 11, a node requiring to establish a new ASL must first announce the new ASL to its collocated neighbors in a CONETS packet and receive the positive ACKs from all its collocated neighbors, before it can announce the proposed ASL to its non-collocated neighbors.

Figure 7:
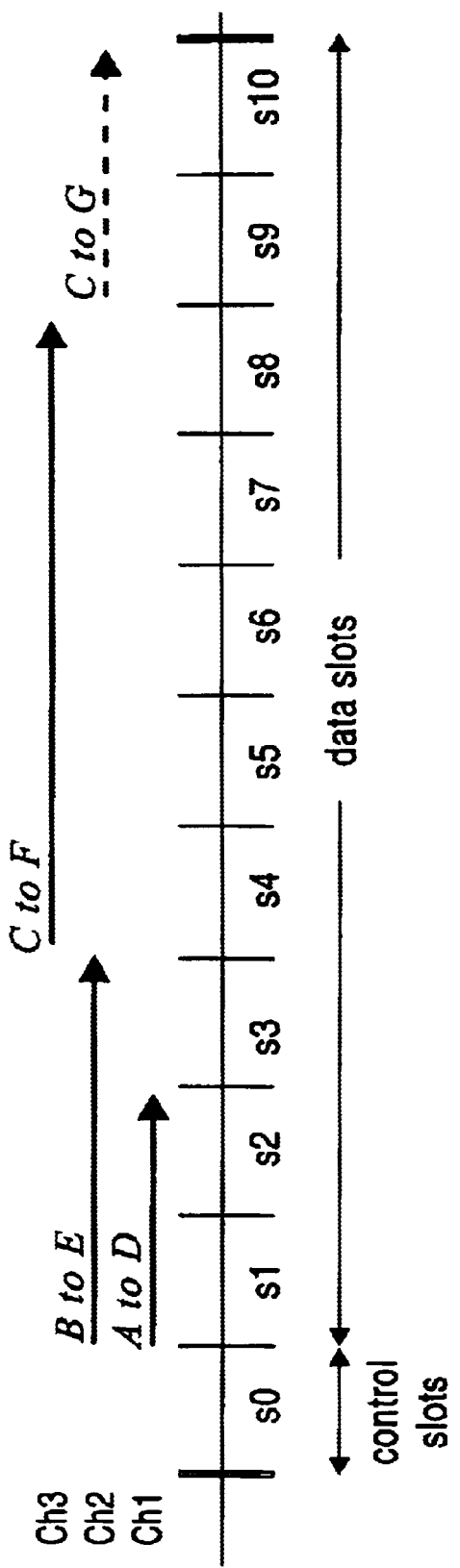
FIG. 7 illustrates scheduling information available at a node according to an embodiment of the invention.

Consider the wireless network shown in FIG. 1. Referring to FIG. 7, for simplicity, the system is assumed to have three orthogonal channels, Ch1–Ch3, and a frame is shown 30 as consisting of one control slot, s0, and 10 data slots, s1–s10. FIG. 7 shows the scheduling information available at IR 180, is labeled node A. As the figure shows, node A has an established ASL with node D in channel 1 lasting for slots 1 and 2. By means of CONETS schedule packets exchanged with its collocated neighbors IR 100 and IR 140, which are labeled B and C, respectively, node A also knows that there is an established ASL from node B to IR 160, which is labeled node E, on channel 2 during slots 1 through 3, an established ASL from node C to IR 130, labeled node F, in channel 3 during slots 4 to 8, and a proposed ASL from node C to IR 110, labeled node G, over channel 2 during slots 9 and 10.

For IR 180, 100, and 140 to send new transmission schedules to IRs to which they connect via radio links, they must exchange CONETS schedule packets among themselves to agree on the next schedule during the data slots of a frame, which they can then use in the control slot(s) of the following frame.

Hence, in this example, IR 100 cannot propose an ASL to IR 160 before its collocated neighbors IR 180 and IR 140 agree on it. Again, the end result of using CONETS among collocated neighbors is that all collocated neighbors present exactly the same transmission schedule during a given frame to their non-collocated neighbors.

Although the invention has been described in the context of particular embodiments, it should be realized that a number of modifications to these teachings may occur to one skilled in the art. Thus while the invention has been particularly shown and described with respect to these particular embodiments thereof, it will be understood that changes in form and scope may be made therein without departing from the scope and spirit of the invention.

What is claimed is:

1. A method, comprising:

scheduling transmissions in a network including a plurality of collocated nodes and a plurality of non-collocated nodes, wherein the plurality of collocated nodes communicate between one another over a first interface and the plurality of non-collocated nodes communicate with the plurality of collocated nodes over a second interface;

exchanging first scheduling information between the plurality of collocated nodes over the first interface, wherein each collocated node maintains a schedule entry for each neighboring collocated node, the schedule entry specifying a neighboring collocated node identifier and a timer, the timer determines a remaining time that the neighboring collocated node and its schedule information can be assumed to be valid, a value of the timer being updated with a reception of a schedule packet from a corresponding neighboring collocated node and the value of the timer being reduced each of a predefined unit of time, wherein the collocated node determines that the corresponding neighboring collocated node is not reachable when the value of the timer is equal to zero;

exchanging second scheduling information associated with transmissions between the plurality of collocated nodes and each of the plurality of non-collocated nodes on the second interface; and determining, based at least in part on the first scheduling information, a schedule for the plurality of collocated nodes for transmissions between the plurality of collocated nodes and each of the plurality of non-collocated nodes on the second interface;

wherein the schedule includes information on when and in what order the transmissions may occur in the network, and wherein the exchanging of scheduling information between the plurality of collocated nodes over the first interface comprises sending a schedule packet from a first collocated node to a second collocated node of the plurality of collocated nodes, the schedule packet including an indication of all known nodes in the two-hop neighborhood of the first node, incoming and outgoing collision-free links of the first node that are already scheduled, time slots and data channels in which new links with the first node can be reserved, and time slots and data channels on which the first node will be listening while not active in scheduled links.

2. The method of claim 1, further comprising:

exchanging scheduling information between the plurality of collocated nodes over the first interface during a time frame while the plurality of non-collocated nodes send data packets to, and receive data packets from, one or more of the plurality of collocated nodes over the second interface.

3. The method of claim 2, wherein the exchanging of scheduling information between the plurality of collocated nodes over the first interface occurs prior to the determining the schedule for the plurality of collocated nodes for transmissions between the plurality of collocated nodes and each of the plurality of non-collocated nodes on the second interface.

4. The method of claim 1, wherein communications over the second interface are performed using a plurality of time frames, each comprising a control and data portion, wherein the scheduling information comprises a first scheduling information, wherein the exchanging of scheduling information comprises exchanging the first scheduling information over the first interface during the data portion of a first time frame, and wherein the method further comprises the exchanging of a second scheduling information between the plurality of non-collocated nodes and each of the plurality of collocated nodes over the second interface during the control portion of the first time frame, the second scheduling information associated with transmissions between the plurality of collocated and each of the plurality of non-collocated nodes.

5. The method of claim 1, wherein the exchanging of scheduling information between the plurality of collocated nodes over the first interface comprises:

sending a schedule packet from a first collocated node of the plurality of collocated nodes to a second collocated node of the plurality of collocated nodes over the first interface; and sending, in response to receiving the schedule packet, an acknowledgement packet from the second collocated node to the first collocated node over the first interface.

6. The method of claim 5, wherein the exchanging of scheduling information between the plurality of collocated nodes over the first interface further comprises:

setting, in the second collocated node, a sequence number of a last received schedule packet to a value of a sequence number of the schedule packet received from the first collocated node;

sending a hello packet from the first collocated node to the second collocated node, the hello packet identifying the first collocated node and a sequence number of a last sent schedule packet from the first collocated node;

determining if the sequence number of the last sent schedule packet indicates that the sequence number of the last sent schedule packet is less than the sequence number of the last received schedule packet;

and, in response to a positive determination:

transmitting a hello-response from the second collocated node to the first collocated node, the hello-response including the sequence number for the last received schedule packet.

7. The method of claim 6, wherein the hello packet comprises a first hello packet and the exchanging of scheduling information between the plurality of collocated nodes over the first interface further comprises:

receiving the hello-response at the first collocated node;

resetting the sequence number of the last sent schedule packet to the larger of the sequence number of the last sent schedule packet or 1 plus the sequence number of the last received schedule packet received in the hello-response; and sending a second hello packet from the first collocated node to the second collocated node, the hello packet identifying the first collocated node and the sequence number of the last sent schedule packet as reset.

8. The method of claim 5, wherein the exchanging of scheduling information between the plurality of collocated nodes over the first interface further comprises:

setting, in the second collocated node, a sequence number of a last received schedule packet to a value of a sequence number of the schedule packet received from the first collocated node;

sending a hello packet from the first collocated node to a second collocated node, the hello packet identifying the first collocated node and a sequence number of a last sent schedule packet from the first collocated node;

determining if the sequence number of the last sent schedule packet indicates that the sequence number of the last sent schedule packet is less than the sequence number of the last received schedule packet;

and, in response to a negative determination, setting the sequence number of the last received schedule packet to the sequence number of the last sent schedule packet.

9. The method of claim 1, wherein the first interface comprises a wired link and the second interface comprises a wireless link.

10. The method of claim 9, wherein the wireless link comprises a plurality of RF channels and the plurality of collocated nodes communicates with at least two of the plurality of non-collocated nodes simultaneously over orthogonal channels of the plurality of RF channels.

11. The method of claim 1, wherein the schedule for the plurality of collocated nodes for transmissions between the plurality of collocated nodes is a conflict-free transmission schedule.

12. A communications network, the network comprising:

a plurality of non-collocated nodes, each of the plurality of non-collocated nodes capable of receiving and transmitting transmissions on a first interface; and a plurality of collocated nodes, the plurality of collocated nodes each capable of communicating between one another over a second interface, each of the plurality of collocated nodes further capable of receiving and transmitting transmissions to and from the plurality of non-collocated nodes on the first interface, wherein the plurality of collocated nodes exchanges scheduling information with one another over the second interface, the scheduling information associated with transmissions between the plurality of collocated nodes and each of the plurality of non-collocated nodes on the first interface, and determines, based at least in part on the scheduling information, a schedule for the plurality of collocated nodes for transmission between the plurality of collocated nodes and each of the plurality of non-collocated nodes on the first interface;

wherein each collocated node maintains a schedule entry for each neighboring collocated node, the schedule entry specifying a neighboring collocated node identifier and a timer, the timer determines a remaining time that the neighboring collocated node and its schedule information can be assumed to be valid, a value of the timer being updated with a reception of a schedule packet from a corresponding neighboring collocated node and the value of the timer being reduced each of a predefined unit of time, wherein the collocated node determines that the corresponding neighboring collocated node is not reachable when the value of the timer is equal to zero, and wherein the plurality of collocated nodes exchanges scheduling information comprising a schedule packet, the schedule packet including an indication of all known nodes in the two-hop neighborhood of a sending collocated node, incoming and outgoing collision-free links of the sending collocated node that are already scheduled, time slots and data channels in which new links with the sending collocated node can be reserved, and time slots and data channels on which the collocated node will be listening while not active in scheduled links.

13. The network of claim 12, wherein the plurality of collocated nodes exchanges the scheduling information over the second interface during a time frame while the plurality of non-collocated nodes send data packets to, and receive data packets from, each of the plurality of collocated nodes over the first interface.

14. The network of claim 13, wherein the time frame comprises a first time frame and wherein the schedule determined by the plurality of collocated nodes comprises a schedule for the plurality of collocated nodes for transmissions between the plurality of non-collocated nodes on the first interface, wherein the transmissions occur during a second time frame subsequent to the first time frame.

15. The network of claim 12, wherein communications over the first interface are performed using a plurality of time frames, each comprising a control and data portion, wherein the scheduling information comprises a first scheduling information, wherein the plurality of collocated nodes exchanges the first scheduling information over the second interface during the data portion of a time frame, and wherein the plurality of collocated nodes further exchanges a second scheduling information with each of the plurality of non-collocated nodes over the first interface during the control portion of the time frame, the second scheduling information associated with transmissions between the plurality of collocated nodes and each of the plurality of non-collocated nodes.

16. The network of claim 12, wherein the first interface comprises a wireless link and the second interface comprises a wired link.

17. An apparatus in a communications network including a plurality of non-collocated routers capable of communicating over a first interface, the apparatus comprising:

at least two collocated routers, the at least two collocated routers capable of communications between one another over a second interface, and the at least two collocated routers capable of communications with each of the plurality of non-collocated routers over the first interface, wherein the at least two routers exchange scheduling information over the second interface, the scheduling information associated with transmissions between the at least two collocated routers and the plurality of non-collocated routers on the first interface, and wherein the at least two collocated routers determine, based at least in part on the scheduling information, a schedule for transmission between the at least two collocated routers and each of the plurality of non-collocated routers on the first interface, wherein each collocated router maintains a schedule entry for each neighboring collocated router, the schedule entry specifying a neighboring collocated router identifier and a timer, the timer determines a remaining time that the neighboring collocated router and its schedule information can be assumed to be valid, a value of the timer being updated with a reception of a schedule packet from a corresponding neighboring collocated router and the value of the timer being reduced each of a predefined unit of time, wherein the collocated router determines that the corresponding neighboring collocated router is not reachable when the value of the timer is equal to zero, and wherein the plurality of collocated nodes exchanges scheduling information comprising a schedule packet, the schedule packet including an indication of all known nodes in the two-hop neighborhood of a sending collocated node, incoming and outgoing collision-free links of the sending collocated node that are already scheduled, time slots and data channels in which new links with the sending collocated node can be reserved, and time slots and data channels on which the collocated node will be listening while not active in scheduled links.

18. The apparatus of claim 17, wherein the first interface comprises a wireless link and the second interface comprises a wired link.

19. The apparatus of claim 18, wherein the at least two collocated routers exchange the scheduling information over the wired link at substantially the same time as the at least two collocated routers exchange data with the plurality of non-collocated nodes over the wireless link.

20. The apparatus of claim 17, wherein the at least two collocated routers and the plurality of non-collocated routers communicating over the first interface use a plurality of time frames, each of the plurality of time frames including a control portion and a data portion, and wherein the at least two collocated routers exchange the scheduling information over the second interface at approximately the same time that one or more frames associated with the data portion of the plurality of frames are transmitted on the first interface.

21. The apparatus of claim 20, wherein the schedule for transmission between the at least two collocated routers and each of the plurality of non-collocated routers on the first interface occurs in a second frame that occurs subsequent to a first frame in which the exchange of schedule information on the second interface occurs.

* * * * *